United States Patent Office.

COE SWARTHOUT OF JOLIET, ILLINOIS.

Letters Patent No. 79,411, dated June 30, 1868.

IMPROVED SALVE.

The Schedule referred to in these Letters Patent and making part of the same.

Be it known that I, COE SWARTHOUT, of the city of Joliet, in Will county, and State of Illinois, have invented a new and useful Compound for Making a Salve; and I do hereby declare the following to be a full, clear, and exact description of the same.

The nature of my invention consists in the combination of certain ingredients, for the purpose of making a salve to be used for healing and other medicinal purposes, the mode of compounding which said ingredients I will now proceed to explain.

The ingredients I use are as follows: Extract of bittersweet, turpentine, salt butter, bees-wax, and balsam of fir, which I combine in the following proportions, viz:

Extract of bittersweet, four ounces.
Turpentine, one and one-half pound.
Salt butter, one pound.
Bees-wax, one pound.
Balsam of fir, twelve ounces.

These ingredients I put together and melt over a slow fire, being careful not to heat the mixture too hot, until the same is thoroughly melted and mixed, after which I strain out any sediment that may be at the bottom, when I allow the same to cool, and is fit for use, making a very effective and healing salve for cuts, bruises, lameness, &c.

Claim.

Having thus described my invention, what I claim as new, and desire to secure by Letters Patent, is—

1. The use of the ingredients, in the proportions and manner described, as and for the uses and purposes set forth.

2. The said salve as a new article of manufacture.

COE SWARTHOUT.

Witnesses:
  THOS. H. HUTCHINS,
  F. L. CAGNIN.